(12) United States Patent
Irvin

(10) Patent No.: US 6,658,264 B1
(45) Date of Patent: Dec. 2, 2003

(54) WIRELESS COMMUNICATIONS TERMINALS AND METHODS INCLUDING MULTIPLE ENTRY PHONEBOOK FOR MULTIPLE TRANSCEIVERS

(75) Inventor: David Rand Irvin, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 402 days.

(21) Appl. No.: 09/585,890

(22) Filed: May 31, 2000

(51) Int. Cl.⁷ .................................................. H04M 1/00
(52) U.S. Cl. .............................. 455/552.1; 455/426.1; 455/550.1; 455/553.1; 379/355.02
(58) Field of Search .................................. 455/123, 132, 455/151.2, 418, 426, 462, 465, 550, 552, 553, 554, 555, 556, 557, 564; 379/88.2, 355.02, 457

(56) References Cited

U.S. PATENT DOCUMENTS

| | | | | |
|---|---|---|---|---|
| 4,266,102 A | * | 5/1981 | Stanley et al. ............... | 379/157 |
| 5,319,698 A | * | 6/1994 | Glidewell et al. ............. | 379/39 |
| 5,428,668 A | | 6/1995 | Dent et al. ..................... | 379/59 |
| 5,526,402 A | | 6/1996 | Dent et al. ..................... | 379/59 |
| 5,535,259 A | | 7/1996 | Dent et al. ..................... | 379/59 |
| 5,581,597 A | | 12/1996 | Dent et al. ..................... | 379/59 |
| 5,737,325 A | | 4/1998 | Fukuda ......................... | 370/337 |
| 5,768,362 A | * | 6/1998 | Moon .......................... | 379/356 |
| 5,812,955 A | | 9/1998 | Dent et al. ................... | 455/561 |
| 6,125,287 A | * | 9/2000 | Cushman et al. ............. | 455/456 |
| 6,314,287 B1 | * | 11/2001 | Leickel et al. ................ | 455/426 |
| 6,351,653 B1 | * | 2/2002 | Alberth et al. ................ | 455/552 |
| 6,360,110 B1 | * | 3/2002 | Schmidt ....................... | 455/564 |
| 6,370,519 B1 | * | 4/2002 | Kim ............................ | 707/1 |
| 6,373,430 B1 | * | 4/2002 | Beason et al. ......... | 342/357.09 |
| 6,430,405 B1 | * | 8/2002 | Jambhekar et al. .......... | 455/403 |
| 6,434,403 B1 | * | 8/2002 | Ausems et al. .............. | 455/556 |

FOREIGN PATENT DOCUMENTS

| | | |
|---|---|---|
| DE | 197 04 907 A1 | 7/1997 |
| EP | 0 793 395 a2 | 9/1997 |

OTHER PUBLICATIONS

Haartsen, *Bluetooth–The Universal Radio Interface for ad hoc, Wireless Connectivity*, Ericsson Review, No. 3, 1998, pp. 110–117.
members.tripod.com/~jwilkers/frspage.html, *Family Radio Service (FRS) Information*.

* cited by examiner

Primary Examiner—William Trost
Assistant Examiner—James Ewart
(74) Attorney, Agent, or Firm—Myers Bigel Sibley & Sajovec PA

(57) ABSTRACT

A wireless communications terminal includes a first transceiver that communicates with a first wireless communications system such as a cellular communications system. A second transceiver communicates with a second wireless communications system that typically has a shorter range than the first transceiver, such as a Bluetooth or FRS system. A multiple entry phonebook includes a first wireless communications system access number and a second wireless communications system access number for each of one or more entities. The wireless communications terminal includes a controller and/or other means that determines whether to use the first wireless communications system access number or the second wireless communications system access number in response to a request to call the corresponding entity. A wireless communication is initiated with the entity over the first wireless communications system using the first transceiver access number and the first transceiver or over the second communications system using the second transceiver access number and the second transceiver, in response to this determination.

33 Claims, 5 Drawing Sheets

| Entity | First Wireless System Access Numbers | Second Wireless System Access Numbers | User System Preference |
|---|---|---|---|
| 1 | Standard Phone Number | Bluetooth Address | First/Second |
| 2 | Standard Phone Number | FRS - Radio Channel | First/Second |
| 3 | Standard Phone Number | Broadcast Message | First/Second |
| ⋮ | ⋮ | ⋮ | ⋮ |

| Entity | First Wireless System Access Numbers | Second Wireless System Access Numbers | User System Preference |
|---|---|---|---|
| 1 | Standard Phone Number | Bluetooth Address | First/ Second |
| 2 | Standard Phone Number | FRS - Radio Channel | First/ Second |
| 3 | Standard Phone Number | Broadcast Message | First/ Second |
| ⋮ | ⋮ | ⋮ | ⋮ |

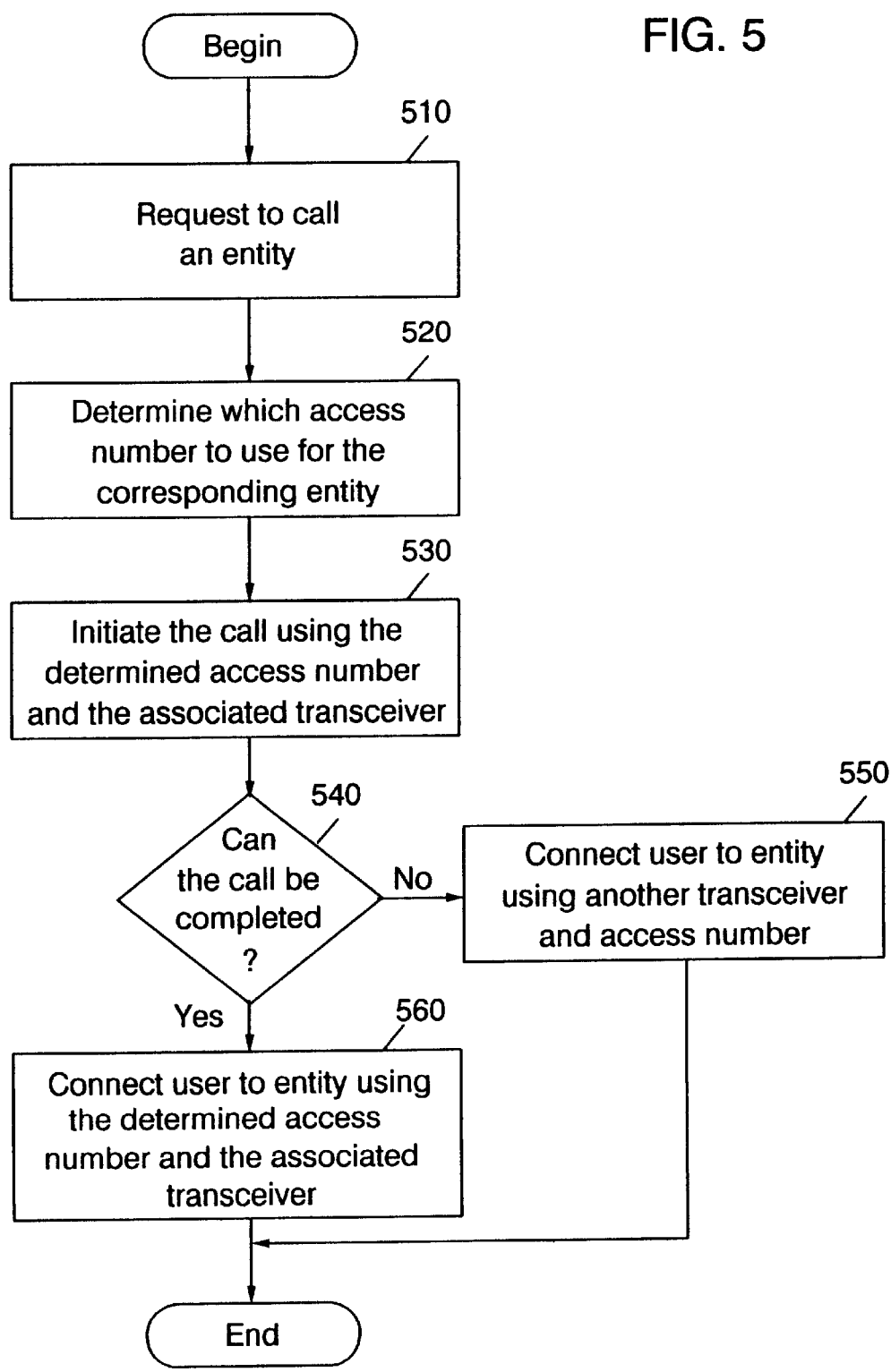

WIRELESS COMMUNICATIONS TERMINALS AND METHODS INCLUDING MULTIPLE ENTRY PHONEBOOK FOR MULTIPLE TRANSCEIVERS

FIELD OF THE INVENTION

This invention relates to communications systems and methods, and more particularly to wireless communications systems and methods.

BACKGROUND OF THE INVENTION

In recent years, wireless communication systems have emerged as an important alternative to wireline communications. These systems can offer users the convenience of mobility and personal services, as well as cost savings over traditional wireline systems in the installation and relocation of telecommunications equipment.

One type of wireless communications systems, cellular telephone systems, uses radio communications between a plurality of wireless communications terminals within the wireless system and between wireless communications terminals and the Public Switched Telephone Network (PSTN) for calls to or from outside the wireless system.

In cellular systems, a geographical area is divided into cells covered by one or more base stations. The cells are connected via a respective base station to a Mobile Services Switching Center (MSC). The MSC, in turn, is connected to the PSTN. The wireless communications terminals communicate with the MSC through the base stations. The MSC can switch calls between wireline and mobile subscribers, control signaling to the wireless communications terminals, compile billing statistics, and/or control the overall operation of the system.

Both analog and digital cellular systems have been developed. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. Multiple mode wireless communications terminals that include, for example, both analog and digital cellular capabilities, also have been introduced.

Satellites also may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system typically includes one or more satellites which serve as relays or transponders between one or more earth stations and wireless communications terminals. The satellite communicates with wireless communications terminals and earth stations over duplex links. The earth station may in turn be connected to the PSTN, allowing communications between wireless communications terminals, and communications between wireless communications terminals and conventional terrestrial cellular radiotelephones or landline telephones. The satellite radiotelephone system may utilize a single antenna beam covering the entire area served by the system, or the satellite may be designed such that it produces multiple minimally-overlapping beams, each serving distinct geographical coverage areas in the system's service region. A satellite and coverage area serve functions similar to that of a base station and cell, respectively, in a terrestrial cellular system.

It also is known to use two way unlicensed radios for wireless communications over limited distances. By using unlicensed two-way radios, the expenses associated with cellular and/or satellite radiotelephone communications may be avoided. Two-way radios include the Family Radio Service (FRS) radio that allows a group to use a small, easy to use and relatively inexpensive two-way radio for voice communications between members of the group. These radios may provide the group a choice of channels to use, to help reduce interference from other groups. FRS radios use the 460 MHz band of the radio spectrum that was allotted by the Federal Communications Commission (FCC) for narrow band two-way FM radio communications over a limited distance. See, for example, the "Family Radio Service (FRS) Information Page" at members.tripod.com.

Another example of wireless two-way radios is the Bluetooth™ personal area wireless networking standard which is a low power, short range, wireless technology designed for local area voice and data communications. Bluetooth technology provides a universal radio interface in the 2.45 GHz frequency band that enables portable electronic devices to connect and communicate wirelessly via short-range ad hoc networks. Bluetooth technology is described, for example, in Haartsen, Bluetooth-The Universal Radio Interface for Ad Hoc, Wireless Connectivity, Ericsson Review No. 3, 1998, pp. 110–117, the disclosure of which is hereby incorporated herein by reference.

SUMMARY OF THE INVENTION

Embodiments of the present invention can provide a multiple-entry phonebook which may contain multiple access numbers for each entity and also may contain user preferences as to which access number to try first. The access numbers for each entity correspond to different transceivers which may be used in a wireless communications terminal to communicate, for example, with a first wireless communication system and with a second wireless communication system over a shorter distance than the first transceiver.

More specifically, according to embodiments of the present invention, a wireless communications terminal includes a first transceiver that communicates with a first wireless communications system such as a cellular communications system. A second transceiver communicates with a second wireless communications system that typically has a shorter range than the first transceiver, such as a Bluetooth or FRS system. A multiple entry phonebook includes a first wireless communications system access number and a second wireless communications system access number for each of at least one entity. The wireless communications terminal includes a controller and/or other means that determines whether to use the first wireless communications system access number or the second wireless communications system access number in response to a request to call the corresponding entity. A wireless communication is initiated with the entity over the first wireless communications system using the first transceiver access number and the first transceiver or over the second communications system using the second transceiver access number and the second transceiver, in response to this determination.

According to other embodiments of the present invention, a wireless communication is initiated with the entity over the second wireless communications system using the second transceiver access number and the second transceiver if it is determined that the second transceiver access number is preferred for wireless communications with the entity. The wireless communications terminal is connected with the entity over the second wireless communications system using the second transceiver if wireless communications with the entity are available over the second wireless communications system. The wireless communications terminal is connected with the entity over the first wireless communications system using the first transceiver if wireless communications with the entity are not available over the second wireless communications system.

According to other embodiments of the present invention, the multiple-entry phonebook includes an indicium as to whether the first wireless communications system access number or the second wireless communications system access number is preferred for wireless communications with the entity. A default indicium also may be included. The indicium may be set and/or changed using conventional wireless terminal programming techniques. Thus, in communicating with an entity a user may specify that a short range, wireless communications system such as Bluetooth or FRS should be used for communication if this mode is available. If this mode is not available then a cellular and/or satellite radiotelephone system may be used. The costs of using a cellular and/or satellite radiotelephone system therefore may be bypassed when other communications systems are available.

Embodiments of the present invention also may provide alternative communication in areas where no wireless infrastructure is present or where cellular access is difficult. For example, embodiments of the present invention may allow wireless terminals to communicate when in an isolated area, as long as the wireless communications terminals are within a certain distance of one another. Embodiments of the present invention also may allow users to communicate within large buildings such as a shopping mall or office building, where cellular radiotelephone signals may be weak. Accordingly, embodiments of the present invention can provide users with communications terminals and methods that can be cost effective and can operate in a variety of environments and conditions.

BRIEF DESCRIPTION OF THE DRAWINGS

FIG. 4 illustrates a multiple-entry phonebook according to embodiments of the present invention.

FIG. 5 is a flow chart illustrating wireless communications terminal operations according to embodiments of the present invention.

DETAILED DESCRIPTION OF PREFERRED EMBODIMENTS

The present invention now will be described with reference to the accompanying drawings, in which the preferred embodiments of the invention are shown. However, this invention may be embodied in many different forms and should not be construed as limited to the specific embodiments shown. Rather, the preferred embodiments are provided so that this disclosure is thorough and complete, and will fully convey the scope of the invention to those skilled in the art.

Figure 1A:
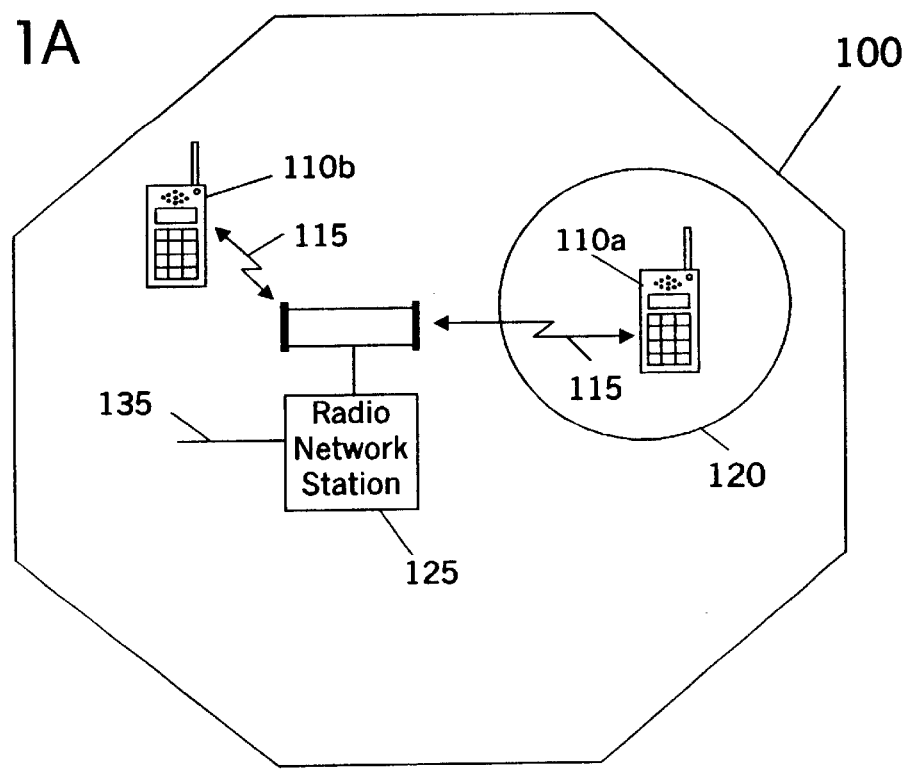
FIGS. 1A and 1B schematically illustrate wireless communications systems according to embodiments of the present invention.
Figure 1B:
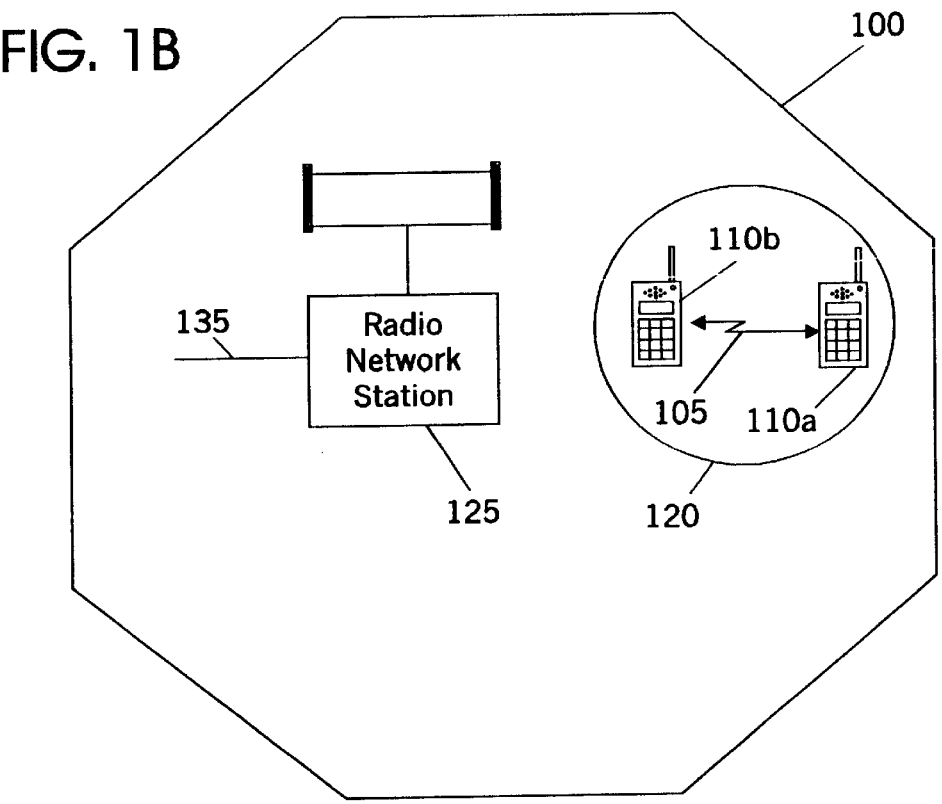

FIGS. 1A and 1B are conceptual illustrations of wireless communications systems and methods according to embodiments of the present invention. In particular, FIGS. 1A and 1B illustrate a wireless communication among multi-mode wireless communications terminals 110a and 110b. It will be understood by those having skill in the art that the term "wireless communications terminal" is used herein to include analog and digital cellular and satellite radiotelephones, multiple mode radiotelephones, high function personal communications systems (PCS) devices that may include large displays, scanners, full size keyboards and the like, and laptop, palmtop and pervasive computing devices that include wireless communications capabilities.

In particular, the wireless communications terminals 110a and 110b include a first transceiver that communicates with a first wireless communications system and a second transceiver that communicates with a second wireless communications system that has a shorter range than the first wireless communications system. Thus, for example, as shown in FIG. 1A, the first wireless communications system may be a cellular radiotelephone communications system 100, including analog and/or digital, terrestrial and/or satellite wireless communications systems. As shown in FIG. 1A, the system 100 may include at least one radio network station 125 such as a cellular radiotelephone base station that provides communications between terminals 110a and 110b over first wireless communications system links 115. The radio network station 125 may be connected to a wire network 135 as is known to those having skill in the art. The wireless communications terminals 110a and 110b may communicate with one another over a wide area that is covered by the system 100 including one or more cells and/or one or more satellite beams.

Referring now to FIG. 1B, when the first and second wireless communications terminals 110a and 110b are within a limited range of one another communications also may take place using the second wireless communications system 120 over a second wireless communications system link 105. In embodiments of the present invention the second wireless communications system may be an unlicensed wireless communications system such as the Bluetooth system or an FRS system. Thus, in embodiments of the present invention, a cellular and/or satellite radiotelephone may be equipped with a limited-distance wireless transceiver, such as a Bluetooth transceiver or an FRS transceiver. The Bluetooth transceiver may be used to communicate with nearby peripheral devices, such as laptop computers and personal digital assistants (PDAs). The FRS transceiver may be used to communicate with other nearby FRS transceivers.

Figure 2:
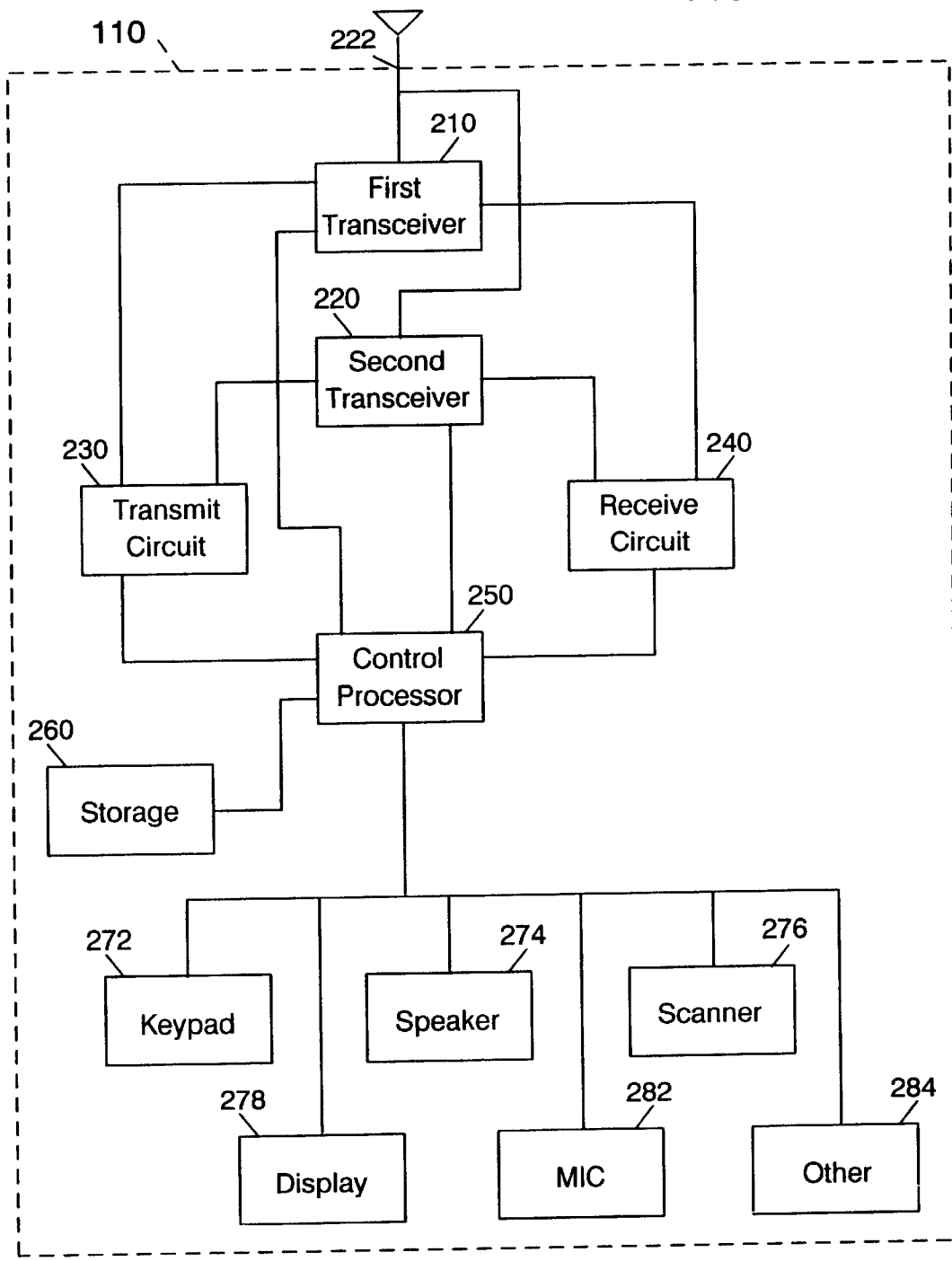
FIG. 2 is a block diagram of wireless communications terminals according to embodiments of the present invention.

FIG. 2 is a block diagram of wireless communications terminals according to embodiments of the present invention. As shown, a wireless communications terminal 110 can be a cellular telephone, a satellite telephone, and/or a high function terminal that provides functions in addition to those of a cellular telephone, such as facsimile, data communications, data processing, word processing, and other personal communications systems functions. These high function terminals are often referred to as Personal Communications Systems (PCS). Multiple mode wireless communication terminals that embody two or more of these functions also are included. Other wireless communication terminals that may omit a display and/or a microphone, also are included. Moreover, any and all of the elements of FIG. 2 may be embodied using one or more analog or digital integrated circuits, integrated circuit microprocessors that run a stored program, Application-Specific Integrated Circuits (ASIC), or any other combination of hardware and/or software.

As shown in FIG. 2, the terminal 110 includes a first transceiver 210 that communicates with a first wireless communications system such as the system 100 of FIGS. 1A and 1B. The terminal 110 also includes a second transceiver 220 that communicates with a second wireless communications system such as the wireless communications system 120 of FIGS. 1A and 1B, that has a shorter range than the first wireless communications system. It will be understood by those having skill in the art that the first and second transceivers need not be two physically separate devices but rather can be implemented using one physical device. Alternatively, the first and second transceivers 210 and 220 can share some circuitry.

Continuing with the description of FIG. 2, the first transceiver 210 and the second transceiver 220 are both connected to an antenna 222. Alternatively, the first transceiver 210 and the second transceiver 220 may be connected to separate antennas.

The terminal 110 also includes a control processor 250 and storage 260 that may be separate from and/or may be incorporated into the control processor 250. A transmit circuit 230 and a receive circuit 240 may perform transmit and receive signal processing, respectively. It will be understood that the transmit circuit 230 and the receive circuit 240 can be embodied in a single digital signal processor or other element and/or may include shared circuitry.

As further shown in FIG. 2, when the wireless communications terminal 110 is a wireless radiotelephone it preferably includes a keypad 272, display 278, a speaker 274 and/or microphone 282. In order to provide a wireless communications terminal for receiving transmission of audio, video, data and/or multimedia signals, the keypad 272 may be a full scale personal computer keyboard and the display 278 may be a large graphic display. A scanner 276 also may be provided as may other devices 284 such as disk drives and/or modems. The design and interconnection of the individual elements of wireless communication terminal 110, as described above, are well known to those having skill in the art and need not be described further herein. As will be described in detail below, in embodiments of the present invention a multiple-entry phonebook may be stored in storage 260 and used by the control processor 250 to control selection and use of the first or second transceiver 210 or 220, respectively.

Figure 3:
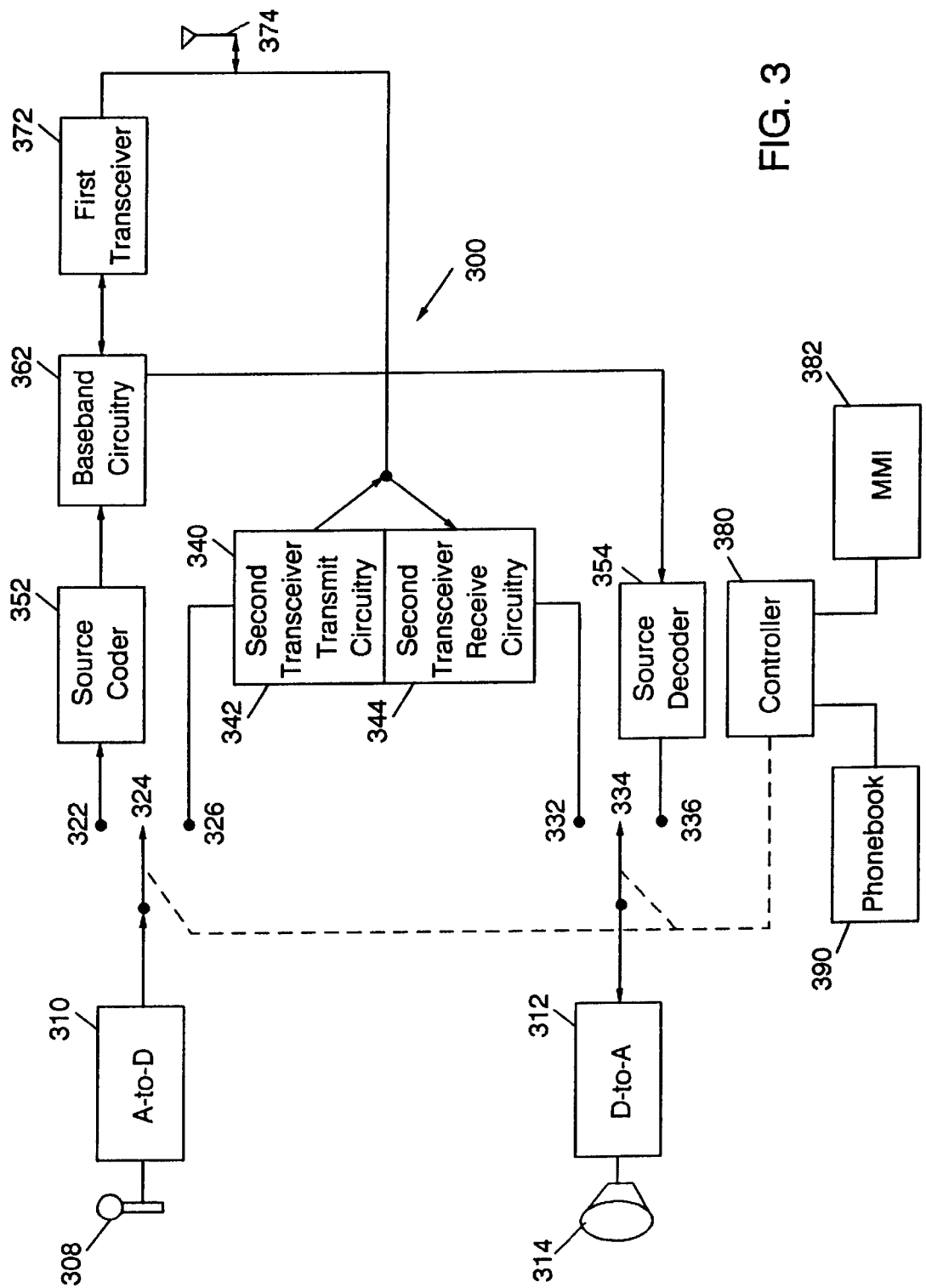
FIG. 3 is a,schematic block diagram of wireless communications terminals according to other embodiments of the present invention.

Referring now to FIG. 3, a block diagram of wireless communications terminals 300 according to other embodiments of the present invention is shown.

Voice communications, for example from microphone 308, may be converted from analog to digital by analog-to-digital converter (A-to-D) 310. This can allow the audio signal processing to be carried out digitally using digital signal processors. However, the signal also may be retained in analog form and/or originate in digital form. Once the signal is converted, it may proceed either to a source coder 352 or to second transceiver transmit circuitry 342 depending on the position of switch 324. It will be understood by those having skill in the art that the switch 324 need not be a physical switch and can be implemented by software and/or other means known in the art. The position of switch 324 may be determined by a controller 380 with reference to the user transceiver preference in a phonebook 390, as will be described in detail below.

If switch 324 operates in position 322, then the signal may proceed to the source coder 325. Then it may proceed to the baseband circuitry 362 that interfaces with the first transceiver 372. The first transceiver 372 may be connected to an antenna 374.

In contrast, if switch 324 operates in position 326, the signal may proceed to the transmit circuitry 342 of the second transceiver 340. The second transceiver 340 is connected to the antenna 374 and transmits over a shorter distance than first transceiver 372. Although antenna 374 is depicted as one antenna in FIG. 3, two separate antennas also can be used. The second transceiver 340 may be, for example, a Bluetooth transceiver and/or an FRS transceiver.

Upon receiving a signal from the first wireless communications system via antenna 374 and the first transceiver 372, the received signal may be processed by the baseband circuitry 362. Then the signal may proceed to source decoder 354 and is finally converted from digital to analog by digital-to-analog converter (D-to-A) 312. Switch 334 is in position 336 during this process, preferably under control of the controller 380. As with switch 324, switch 334 need not be a physical switch.

When a signal is received from the second wireless communications system via the antenna 374 and the second transceiver receive circuitry 344, the signal may be applied to the digital-to-analog converter (D-to-A) 312 which converts the signal from digital to analog. Switch 334 is in position 332 during this process. The analog signal may be converted to an audible signal by a loudspeaker 314 and/or further processed. The signal also may be received in analog form or may be retained in digital form.

Still referring to FIG. 3, the positions of switches 324 and 334 are controlled by the controller 380 to determine whether the first transceiver 372 or the second transceiver 340 is used. As will be described in detail below, the controller 380 may be responsive to a multiple-entry phonebook 390 and also may be responsible to a Man Machine Interface (MMI) 382 that can allow, for example, user selection of preferences for the phonebook 390. It also will be understood that the controller 380 may perform other control functions for the terminal 300, such as controlling operations of the first and second transceivers 372 and 340, respectively, and may be integrated with other functions thereof.

Referring now to FIG. 4, embodiments of multiple-entry phonebooks according to the present invention now will be described. A multiple-entry phonebook 400 may contain an entity number, names, or other identification 405, a first wireless system access number 410, a second wireless system access number 420, and a user system preference 430, also referred to herein as an indicium, for each of one or more entities. It will be understood by those having skill in the art that the multiple-entry phonebook 400 can contain more or less information than the information shown in FIG. 4. The multiple-entry phonebook 400 may be stored in the storage 260 of FIG. 2 and may be accessed through the control processor 250. The multiple entry phonebook 400 may correspond to the phonebook 390 of FIG. 3, and may be accessed through the controller 380. Methods of storing information in memory and of accessing information stored in memory are known to one of skill in the art and need not be discussed further herein.

The entity number 405 represents the person or entity the user may contact, for example using embodiments of FIG. 2 and/or FIG. 3. Each entity in the multiple entry phonebook 400 may have more than one associated access number. It will be understood by those having skill in the art that the multiple-entry phonebook 400 can be accessed using any technique known in the art, for example, by dialing a conventional phone number on a keypad, using a preprogrammed speed dial function, using voice activated dialing and/or other conventional techniques.

The first wireless system access numbers 410, preferably are wide-area access numbers, such as a standard phone number in a cellular, satellite and/or wire network. The second wireless system access numbers 420 preferably are a Bluetooth or other local-area address, such as a packet-header address, an FRS radio channel, and/or a broadcast message channel.

Finally, the multiple-entry phonebook 400 may also contain an indicium, also referred to as a user system preference 430. The user can indicate which transceiver access number to try first with respect to each entity listed in the phonebook when initiating a call by setting the user system preference 430. It will be understood by those having skill in the art that the user system preference may be set in many different ways. For example, the terminal may have a preprogrammed default preference if the user chooses not to set a preference. Alternatively, a user may be prompted to select a preference when a call is initiated. In yet another alternative, a user may program the terminal to prefer a particular transceiver, for example, using conventional phonebook or speed dialing user programming techniques.

Referring now to FIG. 5, operations of wireless communications terminals according to embodiments of the present invention now will be illustrated using flowchart illustrations of methods, apparatus (systems) and computer program products according to embodiments of the invention. It will be understood that each block of the flowchart illustrations, and combinations of blocks, can be implemented by computer program instructions. These computer program instructions may be provided to a processor of a general purpose computer, a special purpose computer, and/or other programmable data processing apparatus to produce a machine, such that the instructions, which execute via the processor of the computer and/or other programmable data processing apparatus, create structures for implementing the functions specified in the flowchart block or blocks. These computer program instructions also may be stored in a computer-readable memory that can direct a computer or other programmable data processing apparatus to function in a particular manner, such that the instructions stored in the computer-readable memory produce an article of manufacture including instructions which implement the function specified in the flowchart block or blocks.

The computer program instructions also may be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the flowchart block or blocks. For example, these operations may be executed by the control processor 250 of FIG. 2 and/or the controller 380 of FIG. 3.

Referring now to FIG. 5, at block 510 a user of the wireless communications terminal may request to call an entity. The request can be in any form known in the art for initiating a call. For example, the user may dial a conventional phone number, push a preprogrammed speed dial function, and/or use voice activated dialing. Then, at block 520, a determination is made as to which access number to use to contact the entity. For example, the determination may be made as to whether to use the first wireless communications system access number or the second wireless communications system access number in response to a request to call the corresponding entity. This determination is made with reference to the user system preference 430. If no preference is indicated a default access number may be used. It will be understood by those having skill in the art that the default access number can be set to any access number and is not limited to a specific access number.

Then, at block 530, the call can be initiated using the access number that was determined and using the associated transceiver. For example, a wireless communication is initiated with the entity over the first wireless communications system using the first transceiver access number and the first transceiver or over the second wireless communications system using the second transceiver access number and the second transceiver, in response to the determination. In a specific example, if it is determined in block 520 that the second transceiver access number should be used, then the second transceiver is used to call the second transceiver access number.

Then, at block 540 a determination is made as to whether the call can be completed. If the call can be completed, then at block 560 the user is connected to the entity using the selected transceiver and the access number that were initially determined. Stated differently, the wireless communications terminal is connected with the entity over the second wireless communications system using the second transceiver if wireless communications with the entity are available over the second wireless communications system. Alternatively, as shown in block 550, if wireless communications with the entity are not available over the second wireless communications system then the wireless communications terminal can be connected with the entity over the first wireless communications system using the first transceiver.

In reference to block 540 in FIG. 5, the call may not be completed for many reasons. For example, if the terminals are not within range of each other then the second transceiver may be unavailable because it may operate over a limited distance. Alternatively, the entity may have disabled communications over the selected wireless communications system, or infrastructure may not be in place at the location in question to support the selected wireless communications system.

Accordingly, embodiments of wireless communications terminals and methods according to the present invention may utilize a multiple-entry phonebook to access different wireless communications systems. Each of these communications systems may have its own transceiver and each transceiver may have its own transceiver access number. These transceiver access numbers may be stored in the multiple-entry phonebook and used to access different wireless communications systems.

Thus, for example, a cellular telephone that incorporates a local-area walkie-talkie transceiver can include a double entry phonebook. When the user of the cellular telephone dials a number to place a call, the double entry phonebook is consulted to see if the cellular number can be associated with a walkie-talkie access number. If the association is positive, the cellular telephone attempts to place the call over the walkie-talkie rather than the cellular network. If this attempt fails, or if no association is found in the phonebook, the cellular telephone places the call conventionally over the cellular network. In preferred embodiments, the walkie-talkie is provided by an integrated Bluetooth transceiver and/or an FRS transceiver. For a Bluetooth transceiver a packet header address may be used as an access number. For an FRS transceiver, the access number may be a prearranged radio channel that the entity is known to monitor, rather than a packet header address. In other cases, the access number may be an address, in which case the cellular radiotelephone can transmit a rudimentary broadcast message according to the physical layer needs of the local area communications system.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. Accordingly, it is intended that the invention be limited only by the spirit and scope of the claims appended hereto.

What is claimed is:

1. A wireless communications terminal comprising:
    a first transceiver that communicates with a first wireless communications system;
    a second transceiver that communicates with a second wireless communications system and has a shorter range than the first transceiver;
    a multiple-entry phonebook comprising a first wireless communications system access number and a second wireless communications system access number for each of at least one entity and an indicium that is set by a user of the wireless communications terminal as to whether the first wireless communications system access number or the second wireless communications system access number is preferred for wireless communications with the at least one entity;
    means for determining whether to use the first wireless communications system access number or the second wireless communications system access number in response to a request to call the corresponding entity; and
    means for initiating a wireless communication with the entity over the first wireless communications system using the first wireless communications system access number and the first transceiver or over the second wireless communications system using the second wireless communications system access number and the second transceiver in response to the means for determining.

2. The wireless communications terminal of claim 1, wherein the means for initiating comprises:
    means for initiating a wireless communication with the entity over the second wireless communications system using the second wireless communications system access number and the second transceiver, if the means for determining determines that the second wireless communications system access number is preferred for wireless communications with the entity;
    means for connecting the wireless communications terminal with the entity over the second wireless communications system using the second transceiver if wireless communications with the entity are available over the second wireless communications system; and
    means for connecting the wireless communications terminal with the entity over the first wireless communications system using the first transceiver if wireless communications with the entity are not available over the second wireless communications system.

3. The wireless communications terminal of claim 1, wherein the means for initiating comprises:
    means for initiating a wireless communication with the entity over the second wireless communications system using the second wireless communications system access number and the second transceiver, if the indicium indicates that the second wireless communications system access number is preferred for wireless communications with the entity;
    means for connecting the wireless communications terminal with the entity over the second wireless communications system using the second transceiver if wireless communications with the entity are available over the second wireless communications system; and
    means for connecting the wireless communications terminal with the entity over the first wireless communications system using the first transceiver if wireless communications with the entity are not available over the second wireless communications system.

4. The wireless communications terminal of claim 1, wherein the first wireless communications system access number comprises a wide-area address and wherein the second wireless communications system access number comprises a local area address.

5. The wireless communications terminal of claim 4, wherein the local area address comprises a universal radio interface in the 2.45 GHz frequency band that enables portable electronic devices to connect and communicate wirelessly via short-range ad hoc networks.

6. The wireless communications terminal of claim 4, wherein the local-area address comprises a packet-header address.

7. The wireless communications terminal of claim 4, wherein the local-area address comprises a radio channel.

8. The wireless communications terminal of claim 4, wherein the local area address comprises a broadcast message channel number.

9. The wireless communications terminal of claim 4, wherein the local area address comprises a Family Radio Service (FRS) transceiver channel.

10. A wireless communications terminal comprising:
    a first transceiver that communicates with a first wireless communications system;
    a second transceiver that communicates with a second wireless communications system and has a shorter range than the first transceiver;
    a multiple-entry phonebook comprising a first wireless-communications system access number and a second wireless communications system access number for each of at least one entity and an indicium that is set by a user of the wireless communications terminal as to whether the first wireless communications system access number or the second wireless communications system access number is preferred for wireless communications with the at least one entity; and
    a controller that is configured to determine whether to use the first wireless communications system access number or the second wireless communications system access number in response to a request to call the corresponding entity, and that is further configured to initiate a wireless communication with the entity over the first wireless communications system using the first wireless communications system access number and the first transceiver or over the second wireless communications system using the second wireless communications system access number and the second transceiver in response to the determination.

11. The wireless communications terminal of claim 10, wherein the controller is further configured to:

initiate a wireless communication with the entity over the second wireless communications system using the second wireless communications system access number and the second transceiver, if the controller determines that the second wireless communications system access number is preferred for wireless communications with the entity;

connect the wireless communications terminal with the entity over the second wireless communications system using the second transceiver if wireless communications with the entity are available over the second wireless communications system; and connect the wireless communications terminal with the entity over the first wireless communications system using the first transceiver if wireless communications with the entity are not available over the second wireless communications system.

12. The wireless communications terminal of claim 10, wherein the controller is further configured to:

initiate a wireless communication with the entity over the second wireless communications system using the second wireless communications system access number and the second transceiver, if the indicium indicates that the second wireless communications system access number is preferred for wireless communications with the entity;

connect the wireless communications terminal with the entity over the second wireless communications system using the second transceiver if wireless communications with the entity are available over the second wireless communications system; and connect the wireless communications terminal with the entity over the first wireless communications system using the first transceiver if wireless communications with the entity are not available over the second wireless communications system.

13. The wireless communications terminal of claim 10, wherein the first wireless communications system access number comprises a wide-area address and wherein the second wireless communications system access number comprises a local area address.

14. The wireless communications terminal of claim 13, wherein the local area address comprises a universal radio interface in the 2.45 GHz frequency band that enables portable electronic devices to connect and communicate wirelessly via short-range ad hoc networks.

15. The wireless communications terminal of claim 13, wherein the local-area address comprises a packet-header address.

16. The wireless communications terminal of claim 13, wherein the local-area address comprises a radio channel.

17. The wireless communications terminal of claim 13, wherein the local area address comprises a broadcast message channel number.

18. The wireless communications terminal of claim 13, wherein the local area address comprises a Family Radio Service (FRS) transceiver channel.

19. A wireless communications method for a wireless communications terminal that includes a first transceiver that communicates with a first wireless communications system and a second transceiver that communicates with a second wireless communications system and has a shorter range than the first transceiver, the method comprising:

accessing a multiple-entry phonebook comprising a first wireless communications system access number and a second wireless communications system access number for each of at least one entity;

determining whether to use the first wireless communications system access number or the second wireless communications system access number in response to a request to call the corresponding entity and an indicium that is set by a user of the wireless communications terminal as to whether the first wireless communications system access number or the second wireless communications system access number is preferred for wireless communications with the at least one entity; and initiating a wireless communication with the entity over the first wireless communications system using the first wireless communications system access number and the first transceiver or over the second wireless communications system using the second wireless communications system access number and the second transceiver in response to the step of determining.

20. The method of claim 19, wherein the step of initiating comprises:

initiating a wireless communication with the entity over the second wireless communications system using the second wireless communications system access number and the second transceiver, if the step of determining determines that the second wireless communications system access number is preferred for wireless communications with the entity;

connecting the wireless communications terminal with the entity over the second wireless communications system using the second transceiver if wireless communications with the entity are available over the second wireless communications system; and connecting the wireless communications terminal with the entity over the first wireless communications system using the first transceiver if wireless communications with the entity are not available over the second wireless communications system.

21. The method of claim 19, wherein the step of initiating comprises:

initiating a wireless communication with the entity over the second wireless communications system using the second wireless communications system access number and the second transceiver, if the indicium indicates that the second wireless communications system access number is preferred for wireless communications with the entity;

connecting the wireless communications terminal with the entity over the second wireless communications system using the second transceiver if wireless communications with the entity are available over the second wireless communications system; and connecting the wireless communications terminal with the entity over the first wireless communications system using the first transceiver if wireless communications with the entity are not available over the second wireless communications system.

22. The method of claim 19, wherein the first wireless communications system access number comprises a wide-area address and wherein the second wireless communications system access number comprises a local area address.

23. The method of claim 22, wherein the local-area address comprises a packet-header address.

24. The method of claim 23, wherein the local-area address comprises a radio channel.

25. The method of claim 23, wherein the local area address comprises a broadcast message channel number.

26. The wireless communications terminal of claim 22, wherein the local area address comprises a universal radio interface in the 2.45 GHz frequency band that enables portable electronic devices to connect and communicate wirelessly via short-range ad hoc networks.

27. The method of claim 23, wherein the local area address comprises a Family Radio Service (FRS) transceiver channel.

28. A wireless communications terminal comprising:
- a cellular radiotelephone transceiver that communicates with a cellular radiotelephone communications system;
- a Family Radio Service (FRS) transceiver that communicates with an FRS communications system;
- a multiple-entry phonebook comprising a cellular access number and an FRS access channel number for each of at least one entity; and
- a controller that is configured to determine whether to use the cellular access number or the FRS access channel number in response to a request to call the corresponding entity, and that is further configured to initiate a wireless communication with the entity over the cellular radiotelephone communications system using the cellular access number and the cellular radiotelephone transceiver or over the FRS communications system using the FRS access channel number and the FRS transceiver in response to the determination.

29. The wireless communications terminal of claim 28, wherein the controller is further configured to:
- initiate a wireless communication with the entity over the FRS communications system using the FRS access channel number and the FRS transceiver, if the controller determines that the FRS access channel number is preferred for wireless communications with the entity;
- connect the wireless communications terminal with the entity over the FRS communications system using the FRS transceiver if wireless communications with the entity are available over the FRS communications system; and
- connect the wireless communications terminal with the entity over the cellular radiotelephone communications system using the cellular radiotelephone transceiver if wireless communications with the entity are not available over the FRS communications system.

30. The wireless communications terminal of claim 29, wherein the multiple-entry phonebook includes an indicium as to whether the cellular access number or the FRS access channel number is preferred for wireless communications with the entity.

31. A wireless communications terminal comprising:
- a cellular radiotelephone transceiver that communicates with a cellular radiotelephone communications system;
- a short range transceiver that communicates with a short range wireless communications system;
- a multiple-entry phonebook comprising a cellular access number and a universal radio interface in the 2.45 GHz frequency band for each of at least one entity, wherein the universal radio interface enables portable electronic devices to connect and communicate wirelessly via short-range ad hoc networks; and
- a controller that is configured to determine whether to use the cellular access number or the universal radio interface in response to a request to call the corresponding entity, and that is further configured to initiate a wireless communication with the entity over the cellular radiotelephone communications system using the cellular access number and the cellular radiotelephone transceiver or over the short range wireless communications system using the universal radio interface and the short range transceiver in response to the determination.

32. The wireless communications terminal of claim 31, wherein the controller is further configured to:
- initiate a wireless communication with the entity over the short range wireless communications system using the universal radio interface and the short range transceiver, if the controller determines that the universal radio interface is preferred for wireless communications with the entity;
- connect the wireless communications terminal with the entity over the short range wireless communications system using the short range transceiver if wireless communications with the entity are available over the short range wireless communications system; and
- connect the wireless communications terminal with the entity over the cellular radiotelephone communications system using the cellular radiotelephone transceiver if wireless communications with the entity are not available over the short range communications system.

33. The wireless communications terminal of claim 31, wherein the multiple-entry phonebook includes an indicium as to whether the cellular access number or the universal radio interface is preferred for wireless communications with the entity.

* * * * *

UNITED STATES PATENT AND TRADEMARK OFFICE
CERTIFICATE OF CORRECTION

PATENT NO. : 6,658,264 B1  Page 1 of 1
DATED : December 2, 2003
INVENTOR(S) : Irvin It is certified that error appears in the above-identified patent and that said Letters Patent is hereby corrected as shown below:

Column 13,
Line 3, should read -- 24. The method of claim 22, wherein the local-area --
Line 5, should read -- 25. The method of claim 22, wherein the local area --
Line 12, should read -- 27. The method of claim 22, wherein the local area --
Line 52, should read -- 30. The wireless communications terminal of claim 28, --

Signed and Sealed this

Twenty-fifth Day of May, 2004

JON W. DUDAS
*Acting Director of the United States Patent and Trademark Office*